United States Patent [19]
Sakurai et al.

[11] Patent Number: 5,829,777
[45] Date of Patent: Nov. 3, 1998

[54] AIR BAG DEVICE

[75] Inventors: Kouji Sakurai, Inazawa; Tadashi Yamamoto, Aichi-ken; Katsunobu Sakane, Ichinomiya, all of Japan

[73] Assignee: Toyoda Gosei Co., Ltd., Aichi, Japan

[21] Appl. No.: 679,371

[22] Filed: Jul. 10, 1996

[30] Foreign Application Priority Data

Jul. 31, 1995 [JP] Japan ................................ 7-194498

[51] Int. Cl.[6] ................................................. B60R 21/16
[52] U.S. Cl. ........................................ 280/728.2; 280/731
[58] Field of Search ............................ 280/728.2, 728.3, 280/731, 732

[56] References Cited

U.S. PATENT DOCUMENTS

| | | | |
|---|---|---|---|
| 4,989,897 | 2/1991 | Takada | 280/728.3 |
| 5,284,359 | 2/1994 | Baba | 280/728.3 |
| 5,435,593 | 7/1995 | Hiramitsu et al. | 280/731 |
| 5,580,082 | 12/1996 | Shiga et al. | 280/728.3 |

FOREIGN PATENT DOCUMENTS

7096813 A   4/1995   Japan .

*Primary Examiner*—Paul N. Dickson
*Attorney, Agent, or Firm*—Cushman Darby & Cushman IP Group of Pillsbury Madison & Sutro, LLP

[57] ABSTRACT

An air bag device includes an air bag, an inflator, a pad, a bag holder, and a retaining plate. The pad has a top wall covering the bag while the bag is in a folded position, and a substantially cylindrical side wall extending from the top wall near its outer edge along an axial direction with respect to a steering wheel column. The side wall has a plurality of pawl holes. The bag holder holds the air bag and is situated radially inward with respect to the side wall of the pad. The bag holder has a plurality of outwardly protruding pawls, each pawl being received by one of the mounting holes of the pad. The side wall of the pad has a first portion not adjacent to the retaining plate and a second portion adjacent to the retaining plate. The pawls protruding through the holes in the first portion of the pad side wall have a protruding length larger than that of the pawls protruding through the holes in its second portion, so as to enhance the ease of assembling the pad to the bag holder.

13 Claims, 6 Drawing Sheets

AIR BAG DEVICE

BACKGROUND OF THE INVENTION

1. Field of the Invention

This invention generally relates to an air bag device which is particularly suitable for application in an automobile, truck, or other vehicle. In particular, the present invention is directed to an air bag-containing device that includes a bag holder for mounting a pad which covers a folded air bag.

2. Description of the Related Art

A known air bag device having a bag holder is described in Japanese Patent Laid-Open Publication No. Hei 796813. In this known device, the bag holder has a plurality of pawls each being received in a plurality of holes formed in a pad to thereby connect the bag holder to the pad. In addition to the pad, the bag holder also is connected to an air bag and an inflator.

The pad is defined by a top wall and a side wall. The top wall covers the folded air bag and is broken upon inflation of the air bag. The side wall has a cylindrical shape, extends downwardly from the lower surface of the top wall, and is positioned near the outer edge of the top wall. The holes which receive the plurality of pawls are formed in the side wall.

The bag holder has a vertically extending portion situated in a radial inward position with respect to the side wall of the pad. The pawls protrude in a radially outward direction from that portion. The pawls are inserted through respective holes in the side wall of the pad and engage the edges of the side wall to hold the pad. The pawls each have a protruding length which is substantially equal to the thickness of the side wall of the pad to which the pawls are engaged.

A retaining plate is situated at a radial outward position with respect to the side wall of the pad so as to surround the side wall. The retaining plate is provided for preventing the disengagement of the pawls from the holes in the side wall of the pad when the air bag is inflated. Therefore, the retaining plate restrains the outward movement of the side wall, which is surrounded by the retaining plate.

The retaining plate is brought into contact with the air bag device when the air bag device is fixed to a steering wheel. Alternatively, the retaining plate can be situated around the entire circumference of the side wall of the pad, and fixed to it. As a further alternative, the retaining plate can be fixed with the inflator when the inflator is fixed to the bag holder.

In order to assure that the pad is reliably mounted on the bag holder, the side wall of the pad is designed so that its inner circumference substantially corresponds to and can be fitted over the outer edge of the bag holder during assembly. A problem is associated with this assembly, however, insofar as a pair of diametrically opposite holes on the side wall of the pad must be movable relative to each other so as to allow the distance therebetween to be increased (expanded) by twice the protruding length of a pawl (i.e., the protruding length of each of the diametrically opposed pawls) when the pawls are engaged with the holes. In addition, other diametrically opposed holes on different portions of the side wall also can be provided for receiving another pair of diametrically opposite pawls.

In order to minimize the amount of expansion required between the side walls and to optimize the reliability of this engagement, this known device selects the protruding length of each pawl to be as small as possible. Accordingly, the protruding lengths of the pawls are the same, each being approximately equal to the thickness of the side wall, regardless of the position of the pawl along the circumference of the side wall of the pad. Nevertheless, the engagement of the pawls with the holes calls for a great deal of time and labor in the known device.

In addition, because the retaining plate extends around the entire circumference of the side wall of the pad, the weight of the air bag device is undesirably increased.

SUMMARY OF THE INVENTION

It is an object of the present invention to address the aforementioned problems associated with the related art by providing an air bag device which is constructed and arranged such that the side walls of the pad can be easily and efficiently engaged with each pawl of a bag holder, without sacrificing the reliability and strength of this engagement.

It is another object of the present invention to provide an air bag device that is light in weight, is affordable, and is easily assembled.

In order to address these and other objectives, this invention provides an air bag device which comprises an expandable air bag, an inflator, and a holder.

The pad is defined by a top wall covering the folded air bag and breakable upon inflation of the air bag, and a depending side wall extending downwardly from the lower surface of the top wall at a position proximal to the outer edge of the top wall. The side wall comprises first and second portions, the portions each having at least one mounting hole, and preferably a plurality of mounting holes, formed therethrough.

The holder interconnects the air bag, the inflator, and the pad. The holder has a vertical portion which is situated radially inward with respect to the side wall of the pad. A plurality of pawls (also referred to herein a mounting members) protrude outward from the outer surface of the holder. This plurality of pawls includes at least one first pawl which extends through a respective mounting hole in one of the portions of the side wall of the pad, and at least one second pawl which extends through a respective mounting hole in the other portion of the side wall. The at least one first pawl has a protruding length that is dimensionally longer than the protruding length of the at least one second pawl. Further, it is preferred that at least one of the mounting holes in the second portion exist in an area diametrically facing the first portion. The first and second portions preferably are spaced apart with a clearance space therebetween.

A retaining plate can be situated in a radially outward position with respect to the side wall of the pad for restraining the outward displacement of those portions of the side wall of the pad which are adjacent to the retaining plate. The retaining plate is situated adjacent to a portion of, but not the entire, the side wall of the pad. According to an embodiment, the portion of the side wall receiving the larger length pawl is not adjacent to the retaining plate, whereas the other portion of the side wall receiving the smaller length pawl is adjacent to the retaining plate.

When mounting the pad to the holder, one of the portions (e.g., the first portion) of the side wall of the pad is initially placed over that portion of the holder having longer pawls (i.e., the at least one first pawl), with those pawls passing through the corresponding holes in the side wall, and engaged with the edges thereof. Then, the other (e.g., second) portion of the side wall is forced down, and the corresponding pawls (i.e., the at least one second pawl) are inserted in the holes of the second portion, and engaged with the edges thereof. Then, the retaining plate is placed around the second portion of the side wall.

When the second portion of the side wall is forced down to engage the bag holder, the second portion is to be moved away from the first portion by a distance equal to the protruding length of the corresponding pawls (i.e., the at least one second pawl) while maintaining the engagement of the first portion with the holder. Because the pawls engaging the first portion have a protruding length which is longer than the thickness of the first portion and longer than the protruding length of the pawls engaging the second portion, it is easy to move or adjust the second portion to permit engagement of the pawls in the holes of the second portion.

The retaining plate is not adjacent to the outer surface of the first portion of the side wall of the pad, and therefore is smaller in size and weight that its counterpart in the known device, which surrounds the entire circumference of the side wall of the pad. Accordingly, the complete air bag device of the present invention has a smaller weight than the known device. There is no concern of the first portion, which is not adjacent to the retaining plate, being inadvertently disengaged from the its corresponding pawls, since those pawls have a larger protruding length than that of the other pawls engaged with the second portion.

Therefore, the pawls on the holder in the air bag device of this invention are easy to engage with the holes in the side wall of the pad to thereby mount the pad to the bag holder. Moreover, because the retaining device does not surround the entire side wall, the complete device is light in weight.

If the second portion is separated from the first portion by a clearance space, this space makes it still easier to move or adjust the second portion with respect to the corresponding pawls, so that the cover is more easily fit over the bag holder.

These and other objects, features, and advantages of the present invention will become apparent from the following detailed description when taken in conjunction with the accompanying drawings which illustrate, by way of example, the principles of the present invention, and wherein like reference numerals designate corresponding portions of the various figures.

BRIEF DESCRIPTION OF THE DRAWINGS

The accompanying drawings illustrate the present invention. In such drawings.

DESCRIPTION OF THE PREFERRED EMBODIMENTS

Description will now be made in detail of an air bag device according to preferred embodiments of this invention with reference to the drawings.

Figure 1:
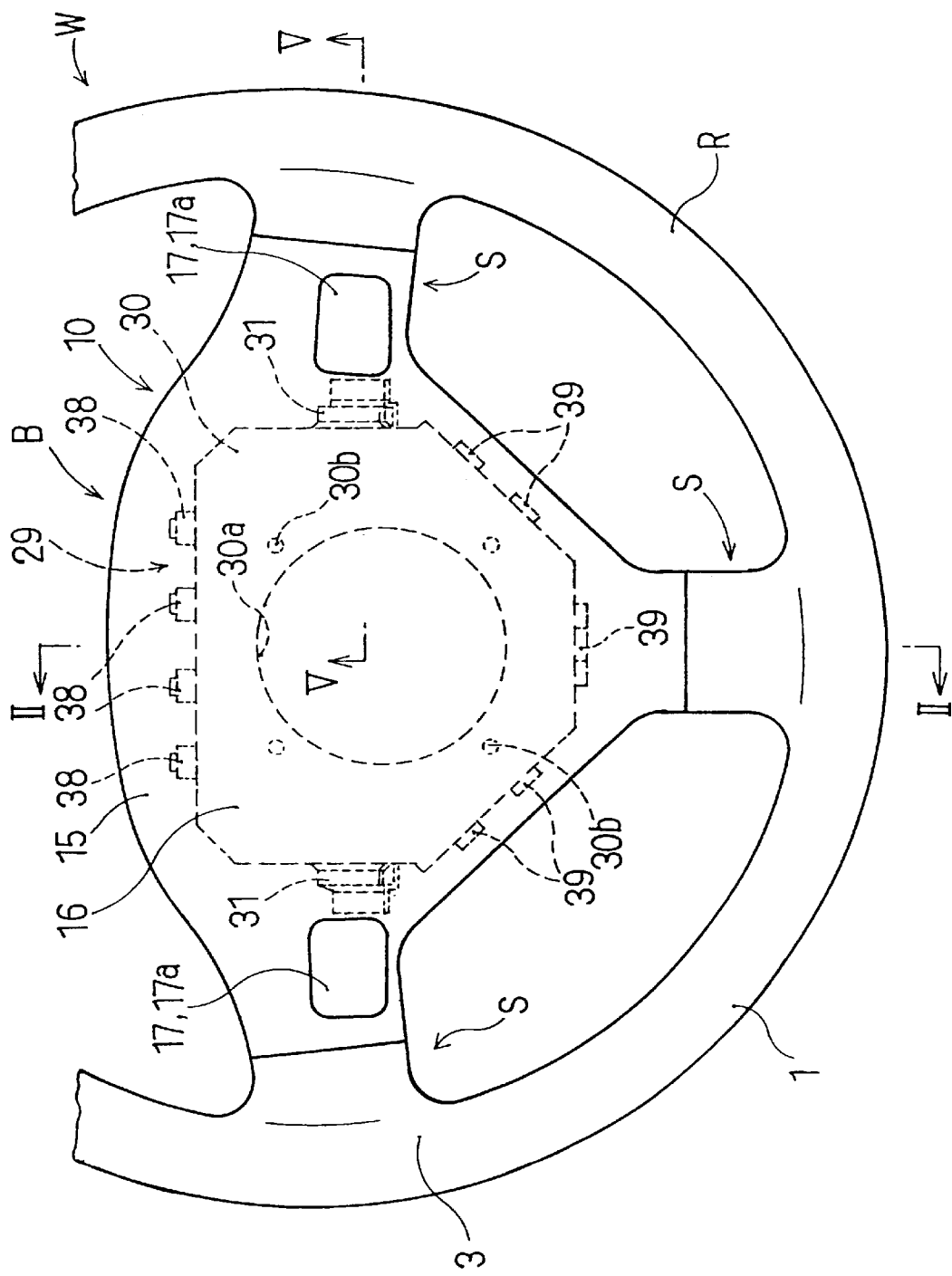
FIG. 1 is a top plan view of a steering wheel equipped with an air bag device according to an embodiment of this invention.
Figure 2:
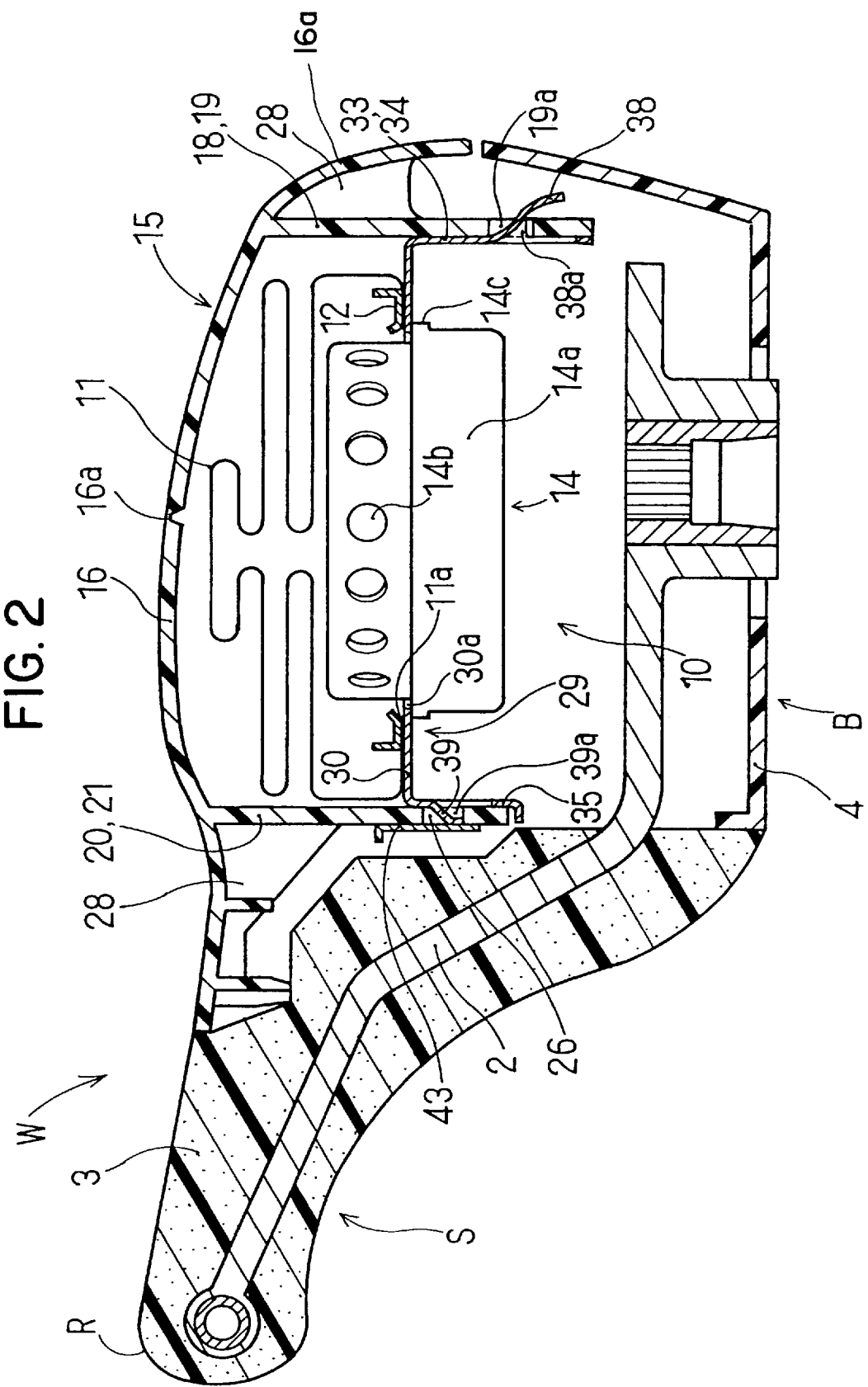
FIG. 2 is a sectional view taken along the line II—II of FIG. 1.
Figure 5:
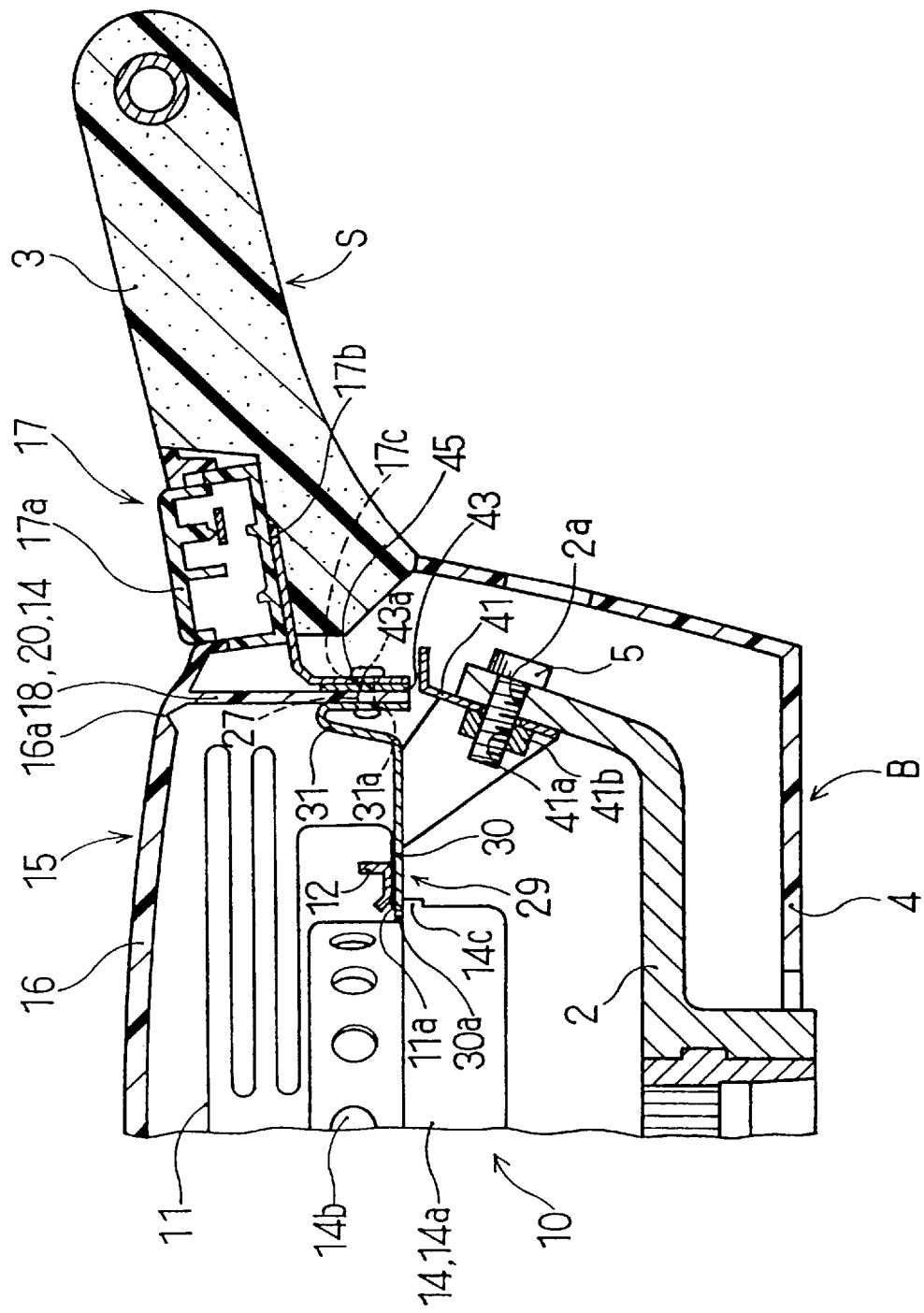
FIG. 5 is a sectional view taken along the line V—V of FIG. 1.

The air bag device according to a first embodiment of this invention is generally identified by reference numeral 10, and is mounted on a steering wheel W, as shown in FIGS. 1, 2 and 5. The steering wheel W comprises a ring (annular member) R, a boss B generally disposed in the center of the ring R, and a plurality of spokes S (three as depicted in the drawings) connecting the ring R to the boss B. The steering wheel W further comprises a main body 1 and the air bag device 10. As illustrated in FIG. 2, the air bag device 10 is situated above the boss B with respect to an axial direction of said steering wheel W.

The main body 1 of the steering wheel comprises a core 2, which is preferably made of metal and extends along a radial direction of the steering wheel, the boss B, the spokes S, an outer cover 3, and a lower cover 4. The outer cover 3 covers the core 2 in the ring R and the spokes S adjacent to the ring R, while the lower cover 4 covers the bottom of the boss B.

The air bag device 10 comprises an air bag 11, an inflator 14, a pad 15 and a bag holder 29 as shown in FIGS. 2 to 5. The air bag 11 is held in a folded position. The inflator 14 is adaptable for supplying the air bag 11 with an inflating gas. The pad 15 covers the folded air bag 11. As discussed in further detail below, the bag holder 29 mounts the air bag 11, the inflator 14 and the pad 15, and also serves to secure the air bag device 10 to the main body 1 of the steering wheel W.

Figure 3:
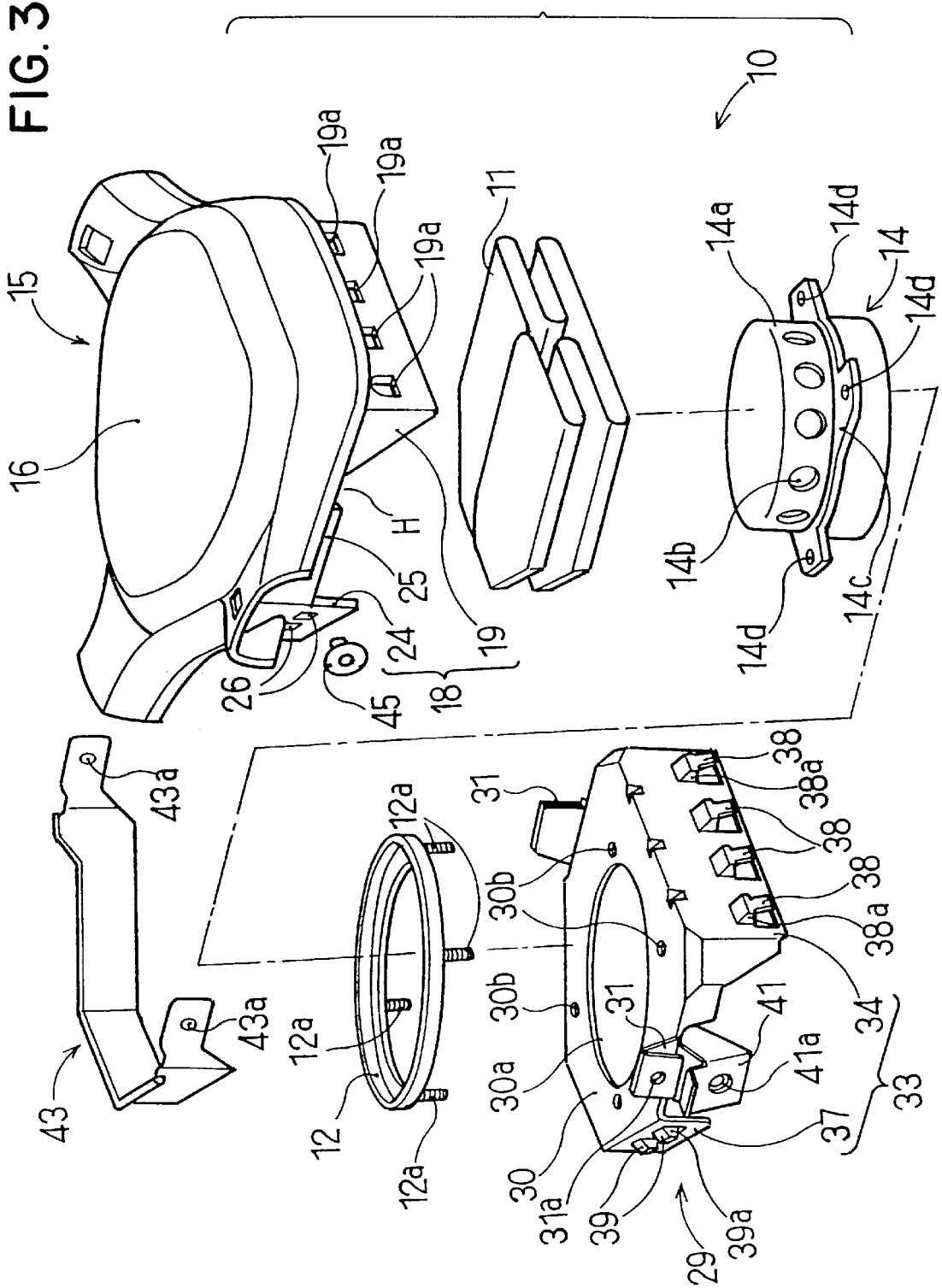
FIG. 3 is an exploded perspective view of the air bag device of FIG. 1.
Figure 4:
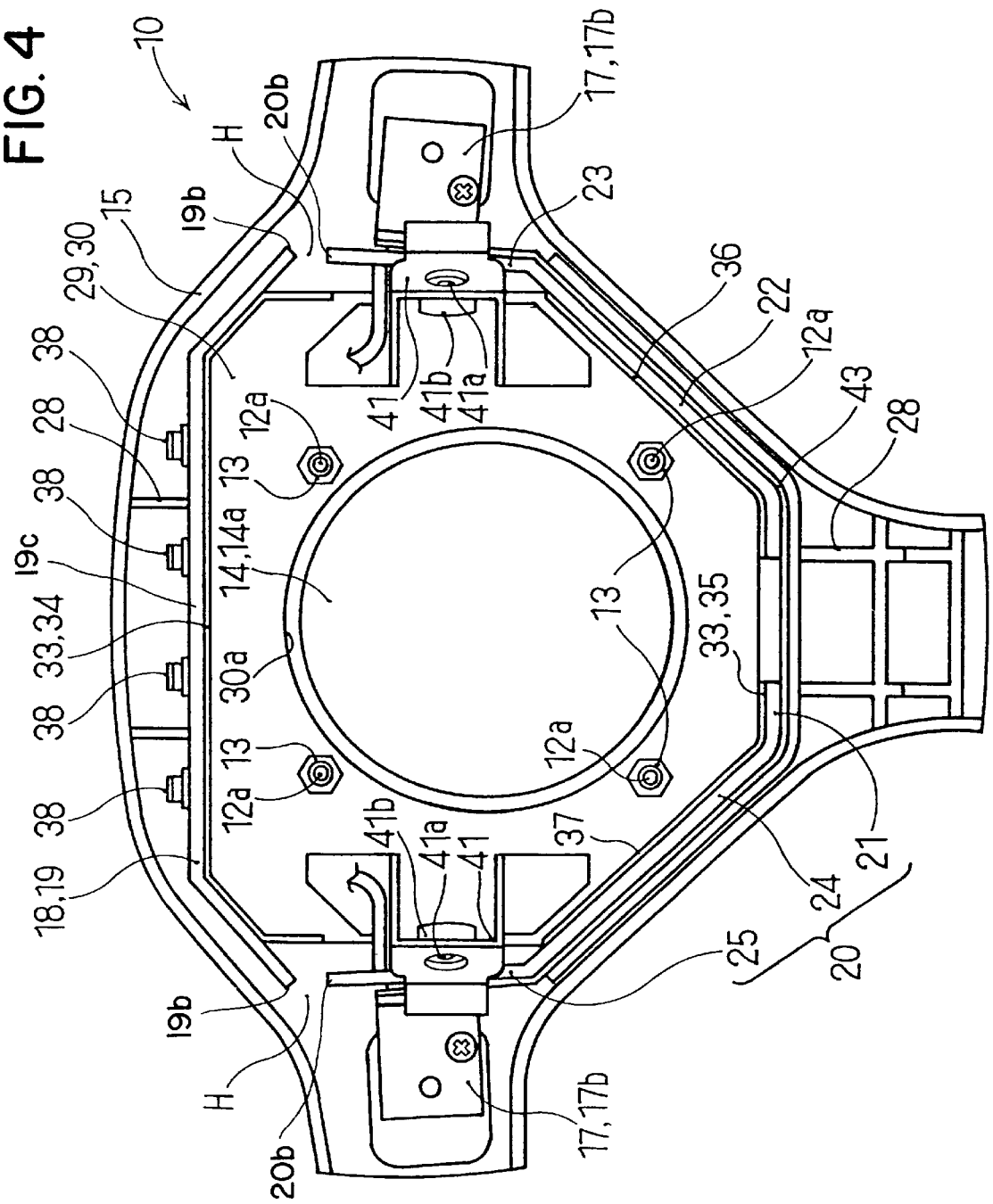
FIG. 4 is a bottom plan-view of the air bag device of FIG. 1.

The air bag 11 preferably has an opening 11a at its bottom, as shown in FIGS. 2, 3 and 5. The air bag 11 contains an annular retainer 12 having a plurality (e.g., four as depicted in FIGS. 3 and 4) of downwardly projecting bolts 12a. Each bolt 12a extends through the edge portion of the air bag 11, which surrounds an opening 11a of the air bag 11, and the bag holder 29. Each bolt 12a also has a nut 13 screwed thereon (see FIG. 4), to thereby fasten the air bag 11 to the bag holder 29.

The inflator 14 comprises a housing 14a and a flange 14c. The housing 14a is cylindrical and has a plurality of gas outlets 14b positioned about an upper portion of the housing 14b. The flange 14c projects from the housing 14a and has a number of through holes 14d. The inflator 14 is secured to the bag holder 29 by the bolts 12a of the retainer 12. Each bolt 12a extends through one of the through holes 14d and is threadedly engaged with the nut 13, whereby the inflator 14 is secured to the air bag 11 by the bag holder 29.

The pad 15 is preferably made of a synthetic resin and comprises a top wall 16 and a side wall 18, as shown in FIGS. 2 to 5. The top wall 16 covers the folded air bag 11. The side wall 18 extends downwardly from the lower surface of the top wall 16 and is spaced from an outer edge portion 16a of the top wall 16.

A portion of the top wall 16 positioned radially inward from the side wall 18 has a tearing portion 16a, which is defined by a reduction in thickness of the top wall 16. The tearing portion 16a is torn easily upon inflation of the air bag 11 by the gas from the inflator 14, so that the air bag 11 may protrude from the pad 15 in a largely expanded form when the air bag 11 is actuated.

The top wall 16 is equipped with a pair of switches 17 positioned proximal to a pair of diametrically opposite spokes S. Each switch 17 is supported by a supporting plate 17b (preferably formed from sheet metal and) having a rivet hole 17c, as shown in FIG. 5. Each switch 17 has a contact (not shown), and a button 17a which can be depressed to actuate a horn (not shown).

According to this embodiment, the side wall 18 is a substantially discontinuous hexagonal cylinder and comprises a first portion 19 and a second portion 20. The first portion 19 is situated on the front side of the steering wheel W, whereas the second portion 20 is separated from the first portion 19 and has ends 20b that preferably are spaced from respective ends 19b of the first portion 19 by a clearance H.

The first portion 19 is not surrounded by a retaining plate 43, whereas the second portion 20 has an outer surface that is adjacent to the retaining plate 43. The first portion also has a plurality (four as depicted in FIG. 3) of juxtaposed mounting through holes 19a, each being positioned transverse with respect to the outer surface of the first portion 19. The first and second portions 19 and 20 are spaced from and connected to the top wall 16 by reinforcing ribs 28.

The second portion 20 is defined by a rear end portion 21, a rear left portion 22, a rear right portion 24, a front left portion 23 and a front right portion 25. The rear end portion 21 is positioned substantially parallel to a middle portion 19c of the first portion 19. The rear left and right (side) portions 22 and 24 extend forwardly and contiguously at an obtuse angle from the left and right ends, respectively, of the rear end portion 21, so as to be arranged in non-parallel planes. The front left and right portions 23 and 25 extend forwardly from the front ends of the rear left and right portions 22 and 24, respectively, so as to be positioned substantially transverse with respect to rear end portion 21. The rear end portion 21 has a mounting through hole 26, and each of the rear left and right portions 22 and 24 has two mounting through holes 26. Each hole 26 has a longitudinal axis. The front left and right portions 23 and 25 also each has a mounting through hole 27 with a longitudinal axis (see FIG. 5). Each hole 26 and 27 receives a rivet 45 for fastening the supporting plate 17b and the retaining plate 43 to the bag holder 29, as described in further detail below.

The bag holder 29 preferably is formed from sheet metal, and is defined by a horizontal portion 30 and a vertical portion 33, as shown in FIGS. 1 to 5, and in particular FIG. 3. The horizontal portion 30 is substantially hexagonal so as to substantially correspond to the shape of and to allow its accommodation in the side wall 18 of the pad 15. The vertical portion 33 extends downwardly from the outer edge of and substantially transverse to the horizontal portion 30.

The horizontal portion 30 has a central opening 30a through which the upper portion of the housing 14a of the inflator 14 is inserted from below. The horizontal portion 30 has a pair of spaced lugs 31, each lug 31 having an inverted V-shaped cross section and being positioned generally transverse to the surface of the horizontal portion 30. Each lug 31 has a rivet hole 31a for receiving the rivet 45, as shown in FIG. 5, whereby the supporting plate 17b for the switch 17 and the retaining plate 43 are secured to the bag holder 29.

A pair of spaced brackets 41 each are welded to the horizontal portion 30 below the lugs 31 so as to be generally transverse to the horizontal portion, and are suitable for securing the air bag device 10 to the core 2 in the main body 1 of the steering wheel. Each bracket 41 has a screw hole 41a which is defined by a nut 41b welded to the bracket 41. The air bag device 10 is secured to the main body 1 of the steering wheel by at least one bolt 5, each bolt 5 being passed through one of a pair of through holes 2a in the core 2 and threadedly engaging each screw hole 41a (see FIG. 5). The horizontal portion 30 also has a plurality of bolt holes 30b, each for receiving one of the bolts 12a of the retainer 12, as shown in FIGS. 1 and 3.

The vertical portion 33 of the bag holder 29 is defined by a front portion 34, a rear portion 35, a rear left portion 36 and a rear right portion 37, as shown in FIGS. 2 to 4. The front portion 34 is situated radially inwardly of and opposes the first portion 19 of the side wall 18 of the pad 15, and the rear portion 35 is situated radially inwardly of and opposes the rear end portion 21 of the second portion 20. The rear left portion 36 is situated radially inwardly of and opposes the rear left portion 22 of the of the second portion 20 of the side wall 18 of the pad 15, and the rear right portion 37 is situated radially inwardly of the rear right portion 24 of the second portion 20.

The front portion 34 of the bag holder 29 has a plurality (four as depicted in FIG. 3) of outwardly protruding pawls 38. The bag holder 29 is arranged with respect to the first portion 19 such that each pawl 38 extends through and engages the edge of one of the holes 19a in the first portion 19 of the side wall 18 of the pad 15. Each pawl 38 can be formed by cutting a part of the front portion 34 and drawing it out; in this manner, each pawl 38 contains a reinforcing rib 38a situated on either side of its base end. The pawls 38 also can be a separate piece that is welded or otherwise attached to the front portion 34

Each of the rear, rear left and rear right portions 35, 36 and 37 also has at least one outwardly protruding pawl, as designated by reference numeral 39. The bag holder 29 is arranged with respect to the side wall 18 of the pad 15 such that each pawl 39 extends through and engages the edge of one of the holes 26 in the rear end, rear left or rear right portion 21, 22 or 24 of the side wall 18 of the pad. Each pawl 39 also preferably is formed by drawing, and has a reinforcing rib 39a on either side thereof.

Each pawl 39 has a protruding length "h2" which is substantially equal to the thickness of the corresponding rear end, rear left or rear right portion 21, 22 or 24 of the side wall 18 of the pad which it engages. By contrast, each pawl 38 has a protruding length "h1" which is larger than the thickness of the corresponding portion of the side wall 18 to which it is engaged. Preferably, "h1" is about twice as large as "h2". In the device shown, the value of "h1" is about twice as large as the thickness of the first portion 19 of the side wall 18 of the pad which each pawl 38 engages.

The rear end, rear left and rear right portions 21, 22 and 24 of the side wall 18 of the pad are adjacent to the retaining plate 43, as shown in FIGS. 2 to 4. The retaining plate 43 holds the portions 21, 22 and 24 so as to prevent disengagement of these portions from the pawls 39, even though those portions may expand upon inflation of the air bag 11. The retaining plate 43 is a substantially U-shaped member and preferable is formed from sheet metal, and has a pair of rivet holes 43a, each being aligned with both one of the rivet holes 17c, rivet holes 31a, and holes 27, for receiving one of the rivets 45, as shown in FIGS. 3 and 5.

Description will now be made of a process for assembling the air bag device 10. The retainer 12 is first inserted in the air bag 11 through opening 11a. The bolts 12a are passed through the edge portion of the air bag 11 which surrounds its opening 11a, and the air bag 11 is folded. Then, the upper portion of the housing 14a of the inflator 14 is inserted through the opening 30a of the horizontal portion 30 of the bag holder 29 from below, and the bolts 12a are passed through holes 30b and holes 14c to connect the retainer 12 to the horizontal portion 30 and the inflator 14, respectively. Each of the nuts 13 are threadedly fitted about one of the bolts 12a for fastening the air bag 11 and the inflator 14 to the bag holder 29.

Figure 6:
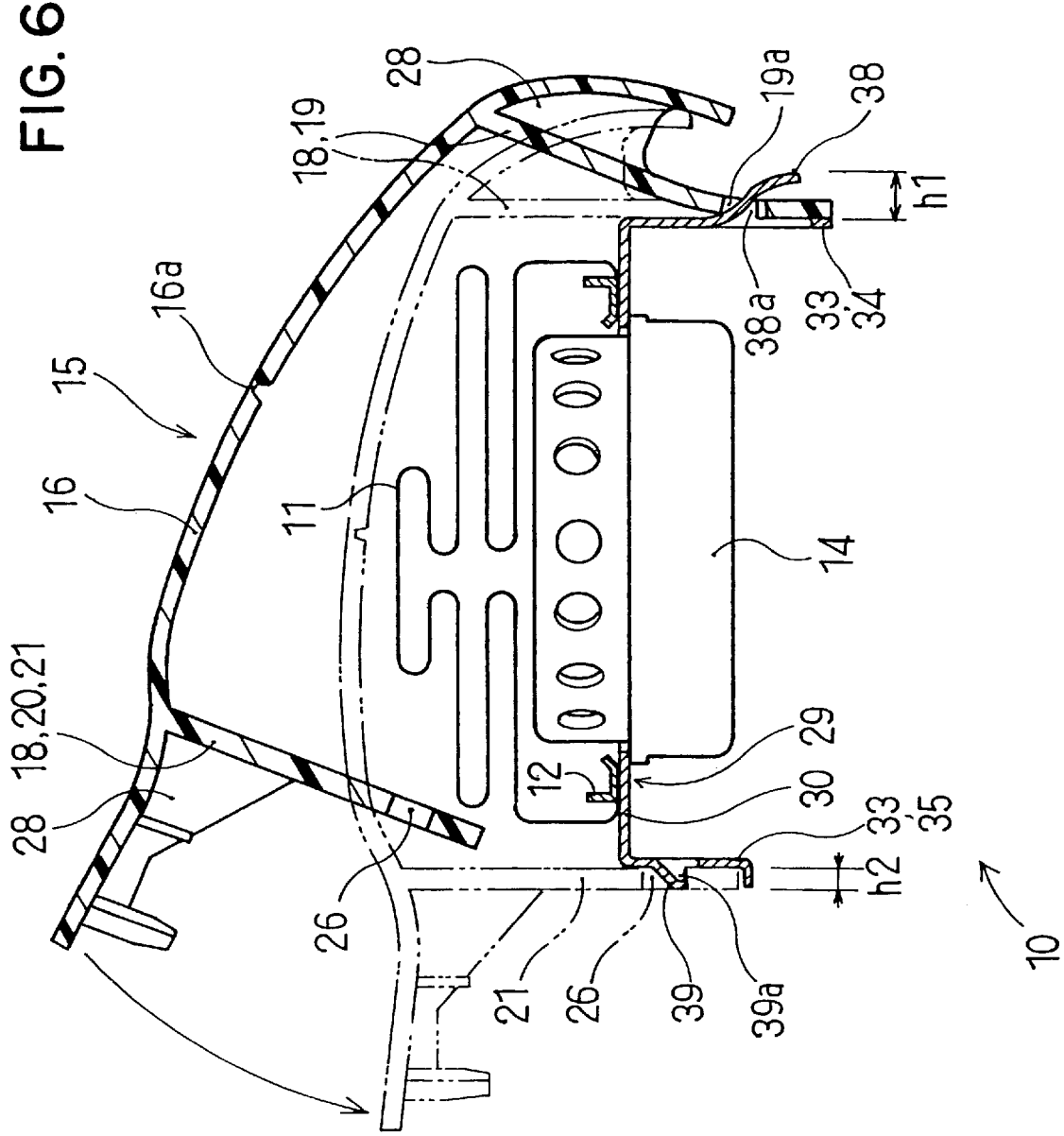
FIG. 6 is a view showing a process for joining a pad to a bag holder in order to assemble the air bag device of FIG. 1.

Then, the first portion 19 of the side wall 18 of the pad 15 is placed adjacent to the front portion 34 of the bag holder 29 having the larger pawls 38 protruding therefrom, as shown in FIG. 6. Each pawl 38 is passed through one of the holes 19a of the first portion 19 and engaged with its edge. Then, the rear end portion 21 of the side wall 18 is forced down, and each of the pawls 39 is passed through one of the holes 26 in the rear end, rear left portion and rear right portion 21, 22 and 24 of the side wall 18, and engaged with its edge.

After the first portion 19 of the side wall 18 is engaged with the pawls 38 on the front portion 34 of the bag holder 29, the pawls 39 can suitably be engaged in the holes 26 by laterally moving the rear end portion 21 of the side wall 18 with respect to the first portion 19 in a direction away from its first portion 19) by a distance equal to the protruding length "h2" of the pawls 39. As a result, it is easy to move the rear end portion 21 of the side wall 18 relative to (and away from) the first portion 19 and thereby engage the pawls 39 in the holes 26 of the rear end 21, rear left portion 22, and rear right portion 24 of the side wall 18.

The presence of the clearance space H, which separates the second portion 20 of 18 of side wall 18 of the pad from its first portion 19, makes it still easier to move the second portion 20 relative to and away from the first portion 19, so as to engage the pawls 39 in the holes 26. The ease of fitting the side wall 18 of the pad over the bag holder 29 is further ensured by the specific construction of the second portion 20. While the rear end (facing) portion 21 faces the first portion 19 diametrically, the rear left and right portions 22 and 24 do not face each other in such a way, but extend at an angle to each other so as to be in non-parallel planes. Therefore, the rear left and right portions 22 and 24 do not need to be expanded in the same direction, but can be expanded in two different directions, when the pawls 39 are passed through the holes 26 in those portions. Thus, it is easy to engage the pawls 39 with the two portions 22 and 24.

Then, the retaining plate 43 is positioned adjacent to the second portion 20 of the side wall 18. Next, the switches 17 are positioned with the top wall 16 of the pad. The rivets 45 are passed through the holes 17c in the supporting plates 17b, the holes 27 in the side wall 18, and the holes 31a in the bag holder lugs 31, whereby the switches 17 and the retaining plate 43 are secured to the bag holder 29, whereupon the air bag device 10 is assembled.

In the above-described embodiment, the bolts 5 are threadedly engaged in the holes 2a of the core 2 and the screw holes 41a of the brackets 41. However, although not shown, the air bag device 10 may be mounted on the main body 1 of the steering wheel W connected to a steering shaft in a vehicle.

The air bag 11 can be inflated by the discharge of gas from the inflator 14 through its gas outlets 14b. As the inflated air bag 11 is filled with gas, the bag 11 expands and comes into contact with an inner surface of the top wall 16. The force applied by the expansion of the bag 11 breaks the top wall 16 along the tearing portion 16a, thereby allowing the bag 11 to jut from the pad 15. Although the retaining plate 43 does not extend along the first portion 19 of the side wall 18 of the pad 15, the first portion 19 does not disengage from the pawls 38, since the pawls 38 have a sufficiently large protruding length "h1".

As is evident from the foregoing, the pad 15 in the air bag device 10 is easy to fasten to the bag holder 29. The retaining plate 43 is small in size and weight, and the air bag device 10 as a whole is accordingly light in weight and easy and inexpensive to assemble.

Although the larger pawls 38, as well as the first portion 19 of the side wall 18 of the pad 15, have been shown and described as being positioned on the front side of the air bag device 10, they can alternatively be positioned on another side of the device 10, including the rear side thereof.

Although the retaining plate 43 and switch 37 have been shown and described as being secured to the bag holder 29 by means of the rivets 45 and rivet holes 43a, 17c, and 31a, it is alternatively possible to connect any combination of these components by other suitable means, including, by way of example, by providing the retaining plate 43 with a lug or lugs through which the bolts 12a extending from the retainer 12 can be passed, and which can be secured to the bag holder 29 by the bolts 12a and the nuts 13.

Although the side wall 18 of the pad has been shown and described as being substantially in the shape of a hexagonal cylinder, it may alternatively be formed substantially in the shape of a square, pentagonal, or other shaped cylinder and/or have no pawl holes along certain sides thereof. For example, for a square wide wall 18, one side of the square cylindrical side wall can define its "first" portion not surrounded by the retaining plate, but held by the larger pawls, while the opposite side thereof can be held by the smaller pawls, while neither of the other two sides is held by any pawl.

Other modifications may be made in the device shown in the drawings, so long as these modifications do not significantly compromise the reliability of the device 10, even after the inflation of the air bag 11. For example, the rear end portion 21 of the side wall 18 can have two or more holes 26 that are engaged by two or more pawls 39, such that the holes 26 from the rear left and right portions 22 and 24, and the corresponding pawls 39 can be eliminated.

An air bag device is disclosed in JP Hei 7-194498, filed on Jul. 31, 1995, the complete disclosure of which is incorporated herein by reference.

It is to be understood that the foregoing description and the accompanying drawings are not intended to limit the scope of this invention; rather, various modifications or variations may be made by anybody of ordinary skill in the art without departing from the scope of this invention which is defined by the appended claims.

What is claimed is:

1. An air bag device comprising:

an expandable air bag retained in a folded position;

an inflator adapted to supply inflating gas to said air bag;

a pad being defined by a top wall and a side wall, said top wall covering said air bag while said air bag is in the folded position and being breakable upon inflation of said air bag, said side wall extending from a lower surface of said top wall at a position proximal to an outer edge of said top wall, said side wall having first and second portions each having at least one hole formed therethrough;

a holder interconnected to said air bag, said inflator, and said pad, said holder having a plurality of pawls including at least one first pawl having a protruding portion which extends through said at least one hole of said first portion and at least one second pawl having a protruding portion which extends through said at least one hole of said second portion, said protruding portion of said at least one first pawl having a length which is larger than a length of said protruding portion of said at least one second pawl; and a retaining plate adjacent to said second portion.

2. A device according to claim 1, wherein said second portion has a facing portion which opposes said first portion in a diametrically opposite relation thereto, and wherein said at least one hole of said second portion is formed through said facing portion.

3. A device according to claim 1, wherein said first and second portions are separated from each other by a clearance space.

4. A device according to claim 1, wherein said second portion comprises a facing portion opposing said first portion in a diametrically opposite relation thereto and two side portions each contiguous to said facing portion, wherein said facing and side portions each have at least one hole formed therethrough, and wherein said side portions are arranged in non-parallel planes.

5. A device according to claim 1, wherein said retaining plate is not adjacent to said first portion.

6. A device according to claim 3, wherein said retaining plate is not adjacent to said first portion.

7. An air bag device comprising:
   an expandable air bag retained in a folded position;
   an inflator adapted to supply inflating gas to said air bag;
   a pad having a breakable top wall covering said air bag while said air bag is in the folded position and a depending side wall, said side wall including first and second portions having first and second sets of holes, respectively, formed therethrough, each said hole having a corresponding thickness;
   a holder interconnected to said air bag, said inflator, and said pad, said holder including first and second sets of mounting members, said mounting members of said first and second sets each being insertable into a corresponding hole of said first and second sets of holes, respectively,
   wherein said mounting members of said first set each have a protruding portion that is dimensionally longer than said thickness of said corresponding hole by a distance greater than a difference between a length of a protruding portion of any of said mounting members of said second set and said thickness of its corresponding hole.

8. A device according to claim 7, further comprising a retaining plate adjacent to said second portion.

9. A device according to claim 8, wherein said first and second portions are separated from each other by a clearance space.

10. A device according to claim 9, wherein said second portion has a facing portion which opposes said first portion in a diametrically opposite relation thereto, and wherein said first set of holes is formed through said first portion and said second set of holes is formed through said facing portion.

11. A device according to claim 9, wherein said second portion comprises a facing portion opposing said first portion in a diametrically opposite relation thereto, and two side portions each contiguous to said facing portion, and wherein said first set of holes is formed through said first portion and said second set of holes is formed through each of said facing and side portions of said second portion, and wherein said side portions are arranged in non-parallel planes.

12. A device according to claim 8, wherein said retaining plate is not adjacent to said first portion.

13. A device according to claim 9, wherein said retaining plate is not adjacent to said first portion.

* * * * *